July 29, 1924.

F. E. GETTS 1,503,235

CABLE END BELL

Filed April 2, 1918

Inventor
Frank E. Getts
By Brown Hanson & Bartlett
Attorneys

July 29, 1924.

F. E. GETTS

CABLE END BELL

Filed April 2, 1918     2 Sheets-Sheet 2

1,503,235

Inventor
Frank E. Getts
By Brown Hanson Porter
Attorneys

Patented July 29, 1924.

1,503,235

UNITED STATES PATENT OFFICE.

FRANK E. GETTS, OF CHICAGO, ILLINOIS, ASSIGNOR TO ELECTRICAL ENGINEERS EQUIPMENT COMPANY, OF CHICAGO, ILLINOIS, A CORPORATION OF ILLINOIS.

CABLE-END BELL.

Application filed April 2, 1918. Serial No. 226,163.

*To all whom it may concern:*

Be it known that I, FRANK E. GETTS, a citizen of the United States, residing at Chicago, in the county of Cook and State of Illinois, have invented a certain new and useful Improvement in Cable-End Bells, of which the following is a full, clear, concise, and exact description, reference being had to the accompanying drawings, forming a part of this specification.

My invention relates to cable end bells.

A cable end bell is employed for the purpose of keeping moisture out of the cable where the strands of the same are separated and come out of the sheath.

My invention is primarily concerned with improved means for gripping and securing the end of the cable sheath within the bell. This is to relieve the cable leads of the strain of supporting the cable and also to ground the cable sheath so as to prevent the accumulation of an injurious static charge on the cable sheath. Heretofore this gripping means has consisted of split clamps and similar devices which were threaded or bolted into the bell or the pipe conduit. These clamps required accurate machining, tapping and threading and in addition to being expensive to manufacture, were difficult and tedious to apply.

The primary object of my invention is to provide simplified, inexpensive and easily applied means for clamping the end of the cable sheath within the bell.

A secondary object of my invention is directed to an improved method of packing the joint between the bell and the cable sheath or cable conduit. This is to prevent leakage of the insulating compound inside the bell and to prevent the entry of moisture to the cable end.

The above features of construction are adaptable to bells designed for any class of service and to bells having means other than those shown for connection with the cable conduit or cable sheath.

In the accompanying drawings in which I have illustrated one preferred embodiment of my invention—

Figure 4 is an inner elevation of a removing cable clamp.

Figure 1:
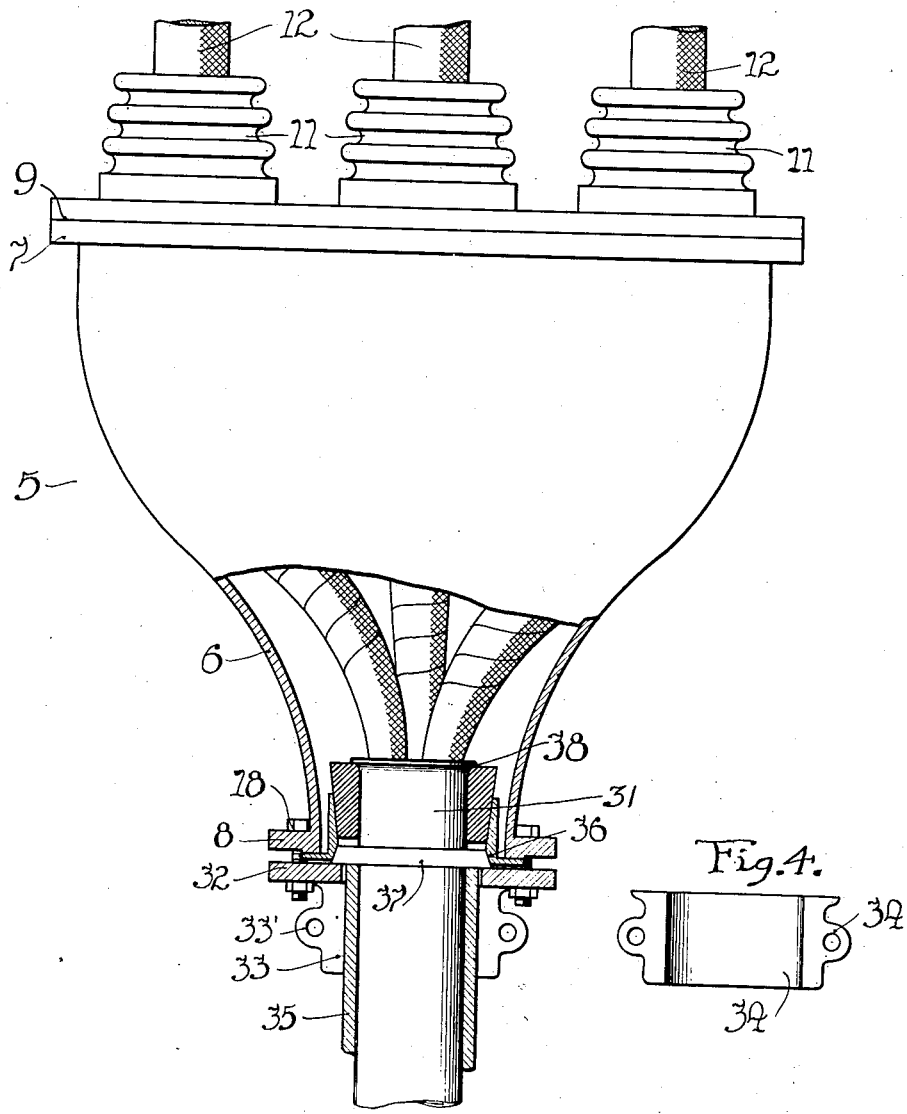
Figure 1 is a front elevational view of a cable end bell clamped to an armored cable, the bell being partly broken away to illustrate the improved wedges and packing ring and one of the clamping members being shown in separated position.

The bell 5 comprises a flaring casing 6 having an upper flange 7 and a lower flange 8. A removable cover 9 is suitably fastened to the upper flange 7 and has outlets provided with insulated bushings 11 through which pass the cable leads 12. Suitable attaching ears may be formed integral with the casing 6.

Figure 2:
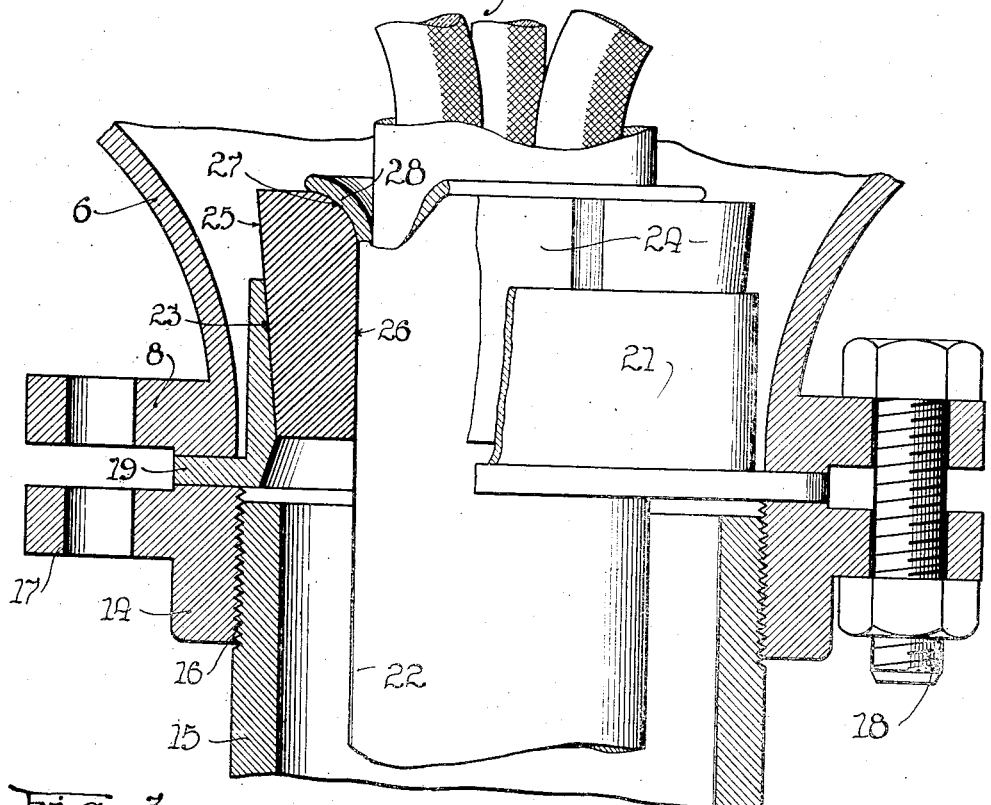
Figure 2 is a fragmentary sectional view of a cable end bell having threaded connection with a cable conduit.

Referring to Figure 2, the lower flange 8 is arranged to have bolted connection with a coupling member 14 which threads down upon the end of the pipe conduit 15 as indicated at 16. This coupling member is provided with a flange 17 having bolt holes aligning with companion bolt holes in the flange 8. Bolts 18 draw these flanges together upon the flange 19 of the circular grounding ring or wedge socket 21.

Figure 3:
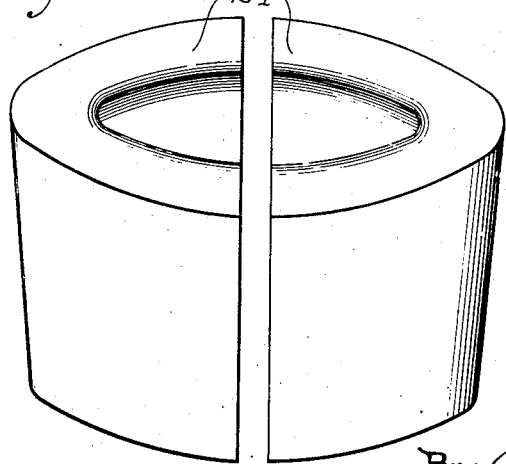
Figure 3 is a perspective view of the wedge members.

This wedge socket extends up into the bell 5 concentrically with the cable 22. The inner face of the socket is flared or conical as shown at 23, and arranged to seat in this tapered socket are the two semi-circular wedge members 24—24, shown in perspective in Figure 3. The outer face 25 of each wedge member is formed with the same taper as the face 23 of the wedge socket, and the inner face 26 is formed cylindrical to embrace the sheath of the cable. The upper inner edge 27 of each wedge is rounded and the end of the lead sheath 28 is flared out over this edge.

To wedge the cable end within the bell, the cable is first pulled out to remove all slack from the pipe conduit and the cable end is dressed with the strands spread out for their appropriate outlets and the edge 28 of the lead sheath rolled back as shown.

I do not illustrate a protective armour outside of the lead sheath in Figure 2, as such must be removed from the end of the cable before the same is entered into the wedge members 24. The wedges are now loosely inserted into the socket ring and the cable is forced back into the conduit until the rolled edge 28 of the lead sheath bears upon the wedges. A few light strokes of a hammer upon the edge 28 and the top of the wedges suffice to drive the wedges tightly into the socket and rigidly wedge the cable sheath in the socket ring. It will be apparent that the harder the cable pulls, the tighter will the wedges clamp it. The wedges 24 are made of lead, babbitt, or some relatively soft material that will not cut into the lead sheath. Obviously more than two wedges may be employed or a single conical split sleeve may be used as I consider that these various forms are equivalents. I preferably construct them of some conducting material whereby they will ground the cable sheath through the grounding or socket ring 21. It is desirable that the end of the cable sheath be grounded, otherwise accumulations of static upon the cable sheath dissipating at the extreme end of the sheath will in turn puncture the insulation.

In Figure 1 I have shown an armored cable 31, unprotected by pipe conduit, with the cable end bell 5 having clamped connection with the same. A flange ring 32 is clamped to the cable 31 by two split clamps 33 and 34. The clamp 33 is preferably made integral with the flange ring 32 and the removable clamp 34 is adapted to be clamped about the cable by bolts passing through ears 33' and 34' on the clamp members.

The armor sheath 35 extends up through the opening in the flange ring 32 and is cut off substantially flush with the top of the ring. The lower flange 8 of the bell is bolted to the ring 32, similarly to the coupling member 14.

The wedges 24 are mounted in the socket ring 21 identically to the preceding arrangement. The reversed taper 36 at the lower inner edge of the socket 21 bears upon a packing ring 37 which has a conical outer surface to agree with the taper 36. This packing ring is of lead, babbitt or the like and is arranged to fit snugly over the lead sheath 38.

The action of tightening up the bolts 18 imposes a radial pressure upon the packing ring 37, through the socket ring 21, and contracts the packing ring tightly about the lead sheath 38. This presents a tight joint to the heated insulating compound when the same is poured into the bell and prevents its leaking down between the wedges 24 and out between the flange ring 32 and the armor sheath 35. Moreover this packing ring effectively excludes moisture from the interior of the bell adjacent the cable end.

I do not intend to be limited to the particular details shown and described.

I claim:

1. In a cable end bell, a cable entering said bell, a tapered socket ring supported in said bell and encircling the cable end, arcuate wedges driven into said socket and gripping said cable, the edge of the cable sheath being turned outward over the tops of said wedges and a packing ring encircling said cable and engaging with said tapered socket.

2. In a cable end bell, a cable entering said bell, an annular socket in said bell, and encircling the cable end, said socket having a radial flange, wedge members seating in said socket and engaging said cable, a flange on the end of said bell, a second flange attached to the cable sheath, the radial flange of said socket extending between said last mentioned flanges and means for clamping said flanges together.

3. In a cable end protector, a double coned socket member surrounding the cable, a multi-part wedging member adapted to be driven into one end of said socket and engage the cable sheath, and a wedging packing ring adapted to seat in the opposite end of the socket member and also engage the sheath of the cable.

4. In a cable end protector, a socket member adapted to surround the cable, said socket member being coned at each end, a coned collapsible member driven into one end of said socket member and engaging the lead sheath of the cable, said member having a rounded edge over which the lead sheath is formed, and a wedging packing ring seated in the opposite coned end of said pocket and compressed against the lead sheath.

5. In a cable end protector a bell adapted to receive a cable end, a flange on the bell, a flanged connector adapted to be secured on the cable sheath, a coned socket in said bell adapted to surround the cable end and having a flange secured between the flanges on the bell and the connector, and means cooperable with said coned socket to secure the cable end in the bell.

6. In a cable end protector, a bell adapted to receive a cable end, a flange on the bell, a flanged connector adapted to be secured on the cable sheath, a coned socket in said bell, adapted to surround the cable and having a flange positioned between the flanges on the bell and the connector, and a compressible packing ring interposed between the socket and the flanged connector, and means for drawing said flanges together and compressing said packing ring around the cable.

7. In a cable end protector, a bell adapted to receive a cable end, a member in said bell adapted to surround a cable end, said member having a rounded edge over which the sheath of the cable may be formed, a coupling member, a socket member having a coned end presented to the coupling member, a packing ring interposed between said socket and coupling members and means for forcing the packing ring into the coned end of the socket member and compressing said packing ring about the cable.

8. In combination, a cable end bell, a cable entering said bell, a socket member through which said cable is adapted to extend, a wedge member fitting into said socket member and engaging the cable, a flange carried by the bell, a coupling member having a flange, and means projecting from the socket member and secured between said flanges.

9. In a cable end bell, a bell member open at its lower end, a closure for said end of the bell member comprising a metallic sheath supporting socket member having an upwardly and outwardly extending flange, said flange extending into the lower end of the bell member and forming a socket, and a metallic hollow cone forming a circular wedge adapted to embrace the upper end of the lead sheath of the cable and to be forced into the socket, said sheath, cone, socket, and bell being all in good electrical contact, and a connecting member adapted to be secured to the lower end of the bell, said socket member being held between said connecting member and the end of the bell.

10. In a cable end bell for a sheathed cable, a casing having an open bottom, a separable metallic socket member attached to the open bottom of said casing and forming a closure therefor, said separable metallic socket member having a flange extending upwardly into the lower end of the casing and a radial attaching flange, said upwardly extending flange having an internally tapered socket, a metallic wedge member having a corresponding external taper, and a bore for the reception of a lead cable sheath, the external surface of said wedge member having direct engagement with the tapered inner surface of the separable socket member, and the inner surface of said wedge member having direct engagement with the lead sheath of the cable to grip the same when the wedge member is forced into the socket member, the end of the cable sheath being flared out over the upper edge of said wedge member.

In witness whereof, I hereunto subscribe my name this 30th day of March, A. D. 1918.

FRANK E. GETTS.